(12) United States Patent
Boesnecker

(10) Patent No.: US 11,226,543 B2
(45) Date of Patent: Jan. 18, 2022

(54) BISTABLE LUMINAIRE

(71) Applicant: AIFC-U UNTERNEHMENSFÖRDERUNG, Potsdam (DE)

(72) Inventor: Robert Boesnecker, Ergolding (DE)

(73) Assignee: AIFC-U UNTERNEHMENSFÖRDERUNG, Potsdam (DE)

( * ) Notice: Subject to any disclaimer, the term of this patent is extended or adjusted under 35 U.S.C. 154(b) by 0 days.

(21) Appl. No.: 16/955,668

(22) PCT Filed: Dec. 13, 2018

(86) PCT No.: PCT/EP2018/084794
§ 371 (c)(1),
(2) Date: Jun. 18, 2020

(87) PCT Pub. No.: WO2019/121334
PCT Pub. Date: Jun. 27, 2019

(65) Prior Publication Data
US 2020/0387051 A1 Dec. 10, 2020

(30) Foreign Application Priority Data
Dec. 22, 2017 (DE) ...................... 10 2017 131 243.9

(51) Int. Cl.
*G03B 15/05* (2021.01)
*H04M 1/22* (2006.01)
*H04N 5/225* (2006.01)

(52) U.S. Cl.
CPC .............. *G03B 15/05* (2013.01); *H04M 1/22* (2013.01); *H04N 5/2256* (2013.01); *G03B 2215/055* (2013.01); *G03B 2215/0567* (2013.01)

(58) Field of Classification Search
CPC .. H04M 1/22; H04N 5/2256; G03B 2215/055
See application file for complete search history.

(56) References Cited

U.S. PATENT DOCUMENTS

| | | |
|---|---|---|
| 7,347,019 B1 | 3/2008 | Shaw |
| 8,967,376 B1 | 3/2015 | Lewbel |

(Continued)

FOREIGN PATENT DOCUMENTS

| | | |
|---|---|---|
| CN | 202510994 U | 10/2012 |
| DE | 69011890 T2 | 2/1995 |

(Continued)

OTHER PUBLICATIONS

PCT; App. No. PCT/EP2018/084794; International Search Report and Written Opinion dated Mar. 1, 2019.

(Continued)

*Primary Examiner* — Evan P Dzierzynski
(74) *Attorney, Agent, or Firm* — Fitch, Even, Tabin & Flannery LLP

(57) ABSTRACT

A lighting apparatus for securing to differently dimensioned objects, in particular mobile devices, is intended to be provided. For this purpose, a lighting apparatus comprising an illuminant and a holding element is proposed, wherein the illuminant is secured to a first end section of a bistable element and the holding element is secured to a second end section of the bistable element, said second end section being situated opposite the first end section. The bistable element is rolled out in a first stable state, such that the illuminant is at a maximum distance from the holding element. The bistable element is rolled together in a second stable state. The lighting apparatus is clampable to the mobile device by spring force of the bistable element.

13 Claims, 5 Drawing Sheets

(56) References Cited

U.S. PATENT DOCUMENTS

Figure 1:
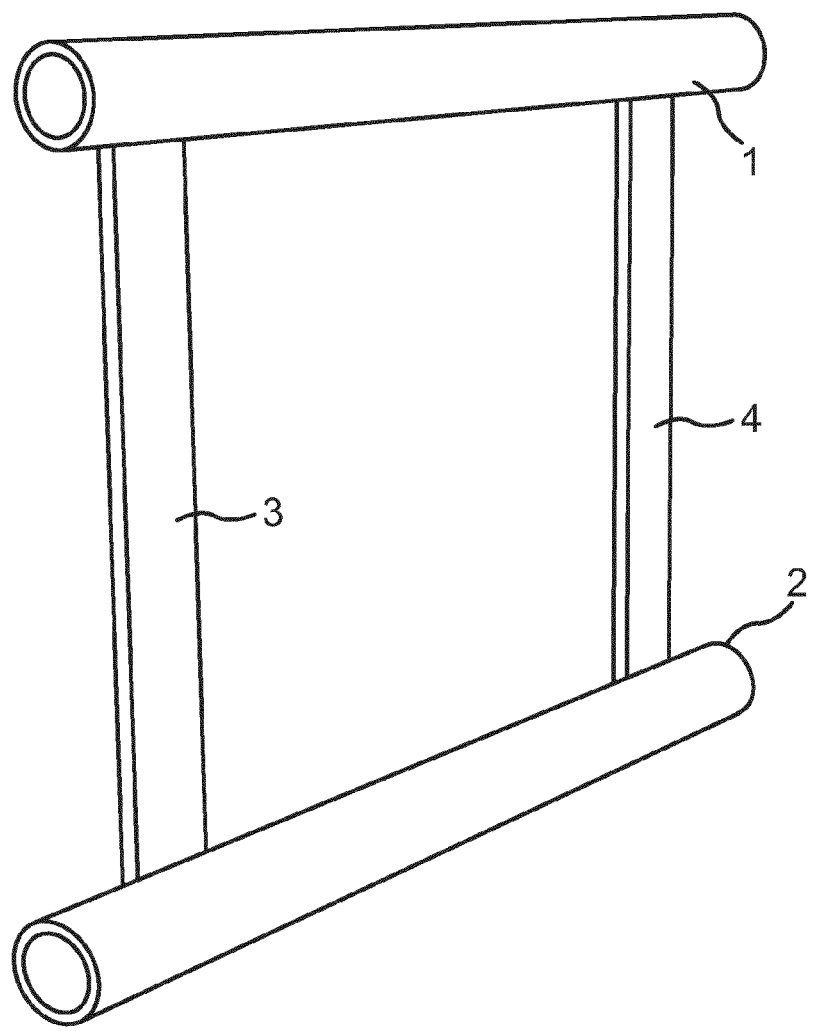

| | | | |
|---|---|---|---|
| 9,176,530 B2* | 11/2015 | Rothkopf | G06F 3/041 |
| 9,534,749 B2* | 1/2017 | Dai | G02B 6/00 |
| 2013/0044215 A1 | 2/2013 | Rothkopf et al. | |
| 2015/0009672 A1 | 1/2015 | Girault | |
| 2015/0177455 A1 | 6/2015 | Chou | |
| 2015/0378391 A1* | 12/2015 | Huitema | G09F 21/02 |
| | | | 361/679.03 |
| 2016/0290624 A1 | 10/2016 | Dai et al. | |
| 2016/0345695 A1 | 12/2016 | Stagge | |

FOREIGN PATENT DOCUMENTS

| | | |
|---|---|---|
| DE | 102016200100 A1 | 7/2017 |
| FR | 2954247 A1 | 6/2011 |
| GB | 1429631 A | 3/1976 |
| WO | 2015139039 A1 | 9/2015 |

OTHER PUBLICATIONS

PCT; App. No. PCT/EP2018/084794; International Preliminary Report on Patentability with Annexes, dated Oct. 25, 2019.
Wikipedia; "Bistability"; https://en.wikipedia.org/wiki/Bistability; accessed Sep. 1, 2021.

* cited by examiner

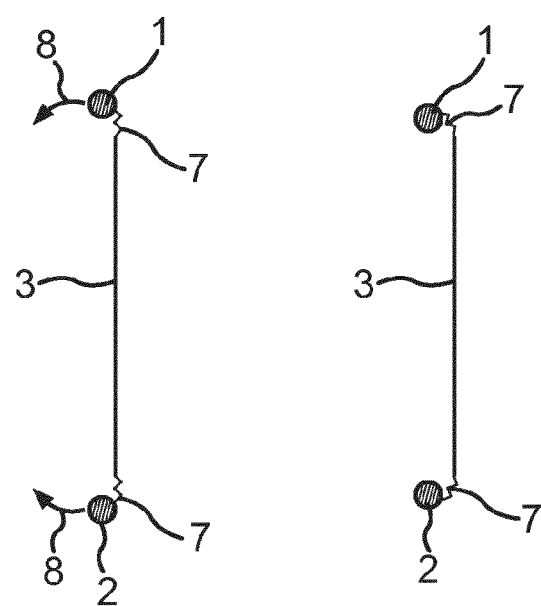

BISTABLE LUMINAIRE

The present invention relates to a lighting device for a mobile device with a luminous element and a retaining element. Moreover, the present invention relates to a device arrangement with a mobile device and such a lighting device.

Today, smart phones, tablets or laptops have a typical appearance, however, their dimensions are not identical. Accordingly, there are own accessories for each smart phone, which consider these mechanical dimensions, e.g. mobile phone or tablet cases, laptop cases and so on.

Often, there is the need to create photographs or video recordings also at poorer lighting conditions with a mobile device, in particular a smart phone or tablet. Thereto, the integrated flash in the mobile device can be an aid. The illumination with the aid of a flash, which mostly represents a point-shaped light source, is usually deficient and only represents an expedient. A high-quality illumination would result in substantially better recordings.

Annular luminous elements are known from the advertisement, which are in particular promoted for the recording of so-called selfies. These luminaires are then plugged onto a smart phone and usually have a range of maximally two meters. However, they are relatively cumbersome and clunky.

A slightly more manageable variant of the ring lights is equipped with bracket-like attachments, which can be plugged onto the smart phone. However, such ring lights often cover a part of the screen of the smart phone when about half of the ring light is plugged over the smart phone.

Furthermore, other approaches are also known to achieve a uniform illumination for example of the face of the smart phone user. Thus, luminous mobile phone cases are for example available, which use LED strips at their edges to achieve a uniform illumination. However, it is disadvantageous that a case only fits a single smart phone type. As soon as this smart phone is out of date and the user buys a new smart phone, he also has to buy a new light case. He can no longer use the old light case. In further configurations, the luminous cases additionally comprise accumulators.

Independently of mobile devices, snap band light wristbands are known. They are composed of a bistable metal band, which is equipped with a flexible board. Usually, two or more light emitting diodes are located on the board. Batteries can be accommodated in the clasp of the wristband. Hereto, reference is also made to the printed matter CN 202 510 994 U.

Moreover, the printed matter US 2016/0345695 A1 discloses a bistable spring post and a housing for a portable mobile device. A plate-shaped spring substantially perpendicularly protrudes from the rear wall of the mobile device, in particular smart phone, and thus constitutes a rear support such that the mobile device can be arranged upright.

Further, the printed matter US 2016/0290624 A1 describes a snap band, which is able to emit light. A bistable spring is coated with a light guide element among other things. Similarly, a light source is integrated in the layer structure.

In addition, the printed matter US 2015/0177455 A1 discloses a lighting device with a bistable spring. Luminous elements are arranged at the edge of the bistable spring, which also roll up in the rolled-up state of the bistable spring.

The word bistable serves for describing equilibriums of a dynamic system in the systems theory. Accordingly, a bistable equilibrium is a special form of a metastable equilibrium. A metastable system transitions into a more stable equilibrium state after a sufficiently great disturbance. With two equilibrium states, one also speaks of bistable. Thus, a bistable system assumes two stable states. All other states are instable or labile.

In other words, bistability is the characteristic of some systems to be able to assume two possible stable states, but only to change from one into the other state by an external stimulus. Thus, only two stable states are possible. Bistable behavior is mostly produced by a positive feedback. Thereby, each of the states stabilizes itself. Thus, an essential point of bistability is further that the states stabilize themselves and the system thus changes itself from a labile or instable state into one of the two stable states without external influence.

For example, bistable relays are known as bistable systems, which can assume exactly two different, stable switching states in a currentless state. While energy has to be continuously supplied to standard relays in the energized state to maintain the switching state, bistable relays only shortly require energy for changing the switching state.

A further bistable system would for example be a spring with two stable equilibrium states according to the documents DE 69 0 118 90 T2 or GB-A-1 429 631. This spring can be employed for control in alternating positioning of movable, mutually cooperating parts and for storing elastic shape change energy.

Further, the printed matter US 2013/0044215 A1 describes a bistable spring with flexible display corresponding to a snap band. The bistable snap band serves as a basis for a wristwatch.

The object of the present invention is in providing a lighting device for a mobile device, which is universally employable and has small dimensions. Moreover, a corresponding device arrangement with a mobile device and such a lighting device is to be specified.

According to the invention, this object is solved by a lighting device according to claim 1. Further, a device arrangement according to claim 11 is provided. Advantageous developments of the invention result from the dependent claims.

Accordingly, corresponding to the present invention, a lighting device for a mobile device, in particular a smart phone, or another object is provided, which comprises a luminous element and a retaining element. Below, it is always made reference to a mobile device representative of any object. The lighting device should be capable of illuminate at least a radius of 1 meter in the perimeter. Thus, recording objects in this perimeter could be sufficiently illuminated for photo recordings or video recordings. The lighting device comprises at least one luminous element and a retaining element. The at least one luminous element preferably comprises one or more LEDs, which can be operated with little energy. The retaining element serves for retaining the lighting device and in particular the luminous element on the mobile device. Thereto, it is advantageous if the luminous element is correspondingly attached to the retaining element.

The luminous element is attached to a first end section of a first bistable element (e.g. band, foil, cloth etc.) and the retaining element is attached to a second end section of the first bistable element opposing the first one. This means that the luminous element and the retaining element are connected by means of the bistable element. Especially, luminous element and retaining element are attached to the opposing end sections of the bistable element. Therein, in particular a section is understood by "end section", which reaches up to the respective end of the element and preferably has a length of up to 20 percent of the overall length of the element.

The first bistable element is unrolled in a first stable state such that the illuminant is maximally spaced from the retaining element. In the first stable state, the bistable element is thus approximately straight and the luminous element as well as the retaining element are stably kept in the largest possible distance from each other in this stable state.

Since the band is bistable, it can assume a second stable state. In this second stable state, it is (completely) rolled up by intrinsic force (without external force effect). This means that the element can assume a defined second state, which is caused by the manufacturing process, in particular the rolling. Namely, the element is preferably a steel band, which has a slightly U-shaped configuration in cross-section. Such bistable elements are for example employed in so-called "click wristbands", which are also referred to as "snap wristband" or "slap wristband". They are wristbands of metal, which wrap around the arm upon slapping onto it. The bands remain in this embraced position until they are again stretched. Such click wristbands are often provided with reflector foils and thus serve as protection in darkness. Such curved spring steel bands are particularly robust and easy to handle.

In the second stable state, the bistable element is in particular completely rolled up. This means that the bistable element assumes a preset inner diameter in this second stable state and the entire element is spirally rolled up. Either the preset inner diameter is given by the inner structure of the bistable element or by an object, around which the bistable element wraps. Since it is usually very flat, the outer diameter of the rolled-up element is only slightly above the inner diameter. Thus, a very compact state of the lighting device arises in the second stable state of the bistable element. For example, only the luminous element and the retaining element protrude from the rolled-up element. Due to the two stable states, comfortable possibilities of employment arise for the lighting device. In the first stable state, when the bistable element is stretched, the lighting device can be retained or arranged on the retaining element and thus be used for general illumination (e.g. makeup illumination). In the second stable state, when the bistable element is rolled up, the lighting device is very compact and can thus be comfortably transported. In an instable state between the first and the second stable state, the element usually attempts to achieve the second stable state, i.e. the rolled-up state. This occurs by means of spring force.

The spring force can be exploited to clamp an item and in particular a mobile device (e.g. smart phone) between the end sections of the bistable element and in particular between the luminous element and the retaining element. Therein, the exterior dimensions of the mobile device can vary in wide ranges without influencing the functionality of clamping between luminous element and retaining element. With suitable longitudinal dimensioning of the bistable element, approximately each smart phone can for example be clamped between luminous element and retaining element such that the entire lighting device retains itself on the smart phone.

Thus, the bistable lighting device with such a bistable element can assume only two stable states. The element, if it is not impeded, autonomously moves from each other state into that stable state of these two stable states, which is achievable without energy increase. In a configuration, the retaining element also has a luminous function, in particular the same as the luminous element. Thus, the luminous element and the retaining element are for example nearly identically formed (e.g. except for electronic components). Thereby, both retaining element and luminous element have a luminous functionality as well as a retaining functionality.

Furthermore, it can be provided that a second bistable element (in particular band element), which is identically formed as the first bistable element (in particular band element), is arranged parallel to the first bistable element, and the luminous element is attached to the first end section of the second bistable element and the retaining element is attached to a second end section of the second bistable element opposing the first one. By the two elements, the lighting device can be even more stably retained on the mobile device than the lighting device with only one element. Among other things, the reason for this is that the retaining force effectively doubles by the second bistable element.

In addition, it can be provided that the retaining element and the luminous element are each cylindrically formed and their longitudinal axes are formed parallel to a roll axis of the first bistable element in the second stable state. Therein, retaining element and luminous element could each for example have a length of 12 to 15 centimeters such that they are approximately as long as smart phones. The diameter of the retaining element and of the luminous element could then be approximately in the range of 5 to 10 millimeters, which approximately corresponds to the thickness of a smart phone. Such a cylindrical shape of the two elements would have the advantage that the elements very well cling to the mobile device when the lighting device is clamped to or retains itself on the mobile device. Moreover, this cylindrical shape of the two elements has the advantage that the entire lighting device can assume a compact configuration in the second stable state of the element, which beneficially affects the transportability.

According to a further configuration, the retaining element and/or the luminous element comprise a battery or an accumulator. Thus, the retaining element can for example supply the energy for the luminous element. Otherwise, if the retaining element also has luminous functionality, the retaining element can supply energy both for itself and for the luminous element. Alternatively, if a battery or an accumulator is provided both in the retaining element and in the luminous element, each element can supply itself with energy.

In a further embodiment, the retaining element or the luminous element comprises a control device for controlling a luminous function of the retaining element and/or the luminous element. Such a control device can for example comprise a switch or a charge display. Moreover, however, the control device can also comprise charging electronics, converter electronics and the like. Usually, it is advantageous if a common control device is present for both elements. However, this does not exclude that both the retaining element and the luminous element comprise an own control device, e.g. an own switch or dimmer.

Furthermore, it can be provided that the luminous element comprises one or more light emitting diodes. If only one light emitting diode is provided, the light can be distributed via light guides. Thus, the light emitting diode can for example be arranged at one end of the luminous element and the light guide can extend along the luminous element and uniformly emit light there. The same applies to the retaining element if a corresponding luminous function is provided. In case of multiple light emitting diodes, they can be distributed along the luminous element and retaining element, respectively. The multiple light emitting diodes can be controlled in common or independently of each other. With independently controlled light emitting diodes, the illuminance of the lighting device can be correspondingly differently varied.

According to a further embodiment, the luminous element and/or the retaining element can be telescopically extendable, in particular on both sides. In this manner, the physical extension of the lighting device can be reduced in particular for the purpose of transport. For example, the luminous element comprises three telescopic elements, wherein only the middle one is attached to the first and/or second bistable element. The two outer telescopic elements are then e.g. retractable into the middle telescopic element. Optionally, only the outer telescopic elements have luminous functionality, or else all of the three telescopic elements can light. Alternatively, the luminous element can of course also comprise only two telescopic elements or else more than three telescopic elements.

Furthermore, it may be beneficial if the luminous element and/or the retaining element are each attached to the respective end of the first bistable element by an elastic spring element, wherein the lighting device with the first bistable element in its first stable state and the spring elements in their relaxed state has a bracket-like shape in cross-section. In some circumstances, it is more beneficial in terms of stability if the retaining element and/or luminous element are attached to the respective end section of the bistable element with the additional spring element. By the additional spring element, there is an additional degree of freedom with respect to the forces, which the lighting device can exert on the mobile device, to achieve a stable retaining effect. By the special bracket-like shape, which can be achieved with the spring elements, the edge of a mobile device can in particular be better encompassed. This can considerably increase the retaining stability.

Corresponding to a further configuration, it is provided that at least one of the luminous element and the retaining element is water-proof and encloses a gas volume. By this configuration, it is possible that the lighting device serves as a float. Attached to the mobile device, it can thus ensure that the mobile device does not sink in water.

As was already indicated above, corresponding to the present invention, a device arrangement with a mobile device (in particular smart phone) and a lighting device of the above mentioned type is also provided. In this arrangement, the first bistable element is neither in the first nor in the second stable state and the first bistable element therein presses the retaining element onto a first side of the mobile device and the luminous element onto a second side of the mobile device opposing the first side such that the lighting device is retained on the mobile device. In particular, the bistable element presses the luminous element and the retaining element onto the respective narrow sides of the mobile device or onto the edges of these narrow sides. By the spring force of the at least one bistable element, a retaining force for the lighting device arises, which retains it on the mobile device. Preferably, the lighting device comprises e.g. rubber-shaped friction elements in order that the friction on the mobile device is correspondingly increased. Thereto, retaining element and luminous element can be completely or partially manufactured of corresponding materials with high friction coefficients.

Preferably, the mobile device is a smart phone, a tablet or a laptop. It can then be achieved by the lighting device that the respective mobile device comprises sufficient illuminants to take high-quality recordings like selfies.

An alternative device arrangement comprises a lighting device of the above mentioned type and a separate retaining device. Therein, the first bistable element is plugged into the retaining device in the first stable state and is retained there such that the luminous element stands substantially perpendicularly above the retaining element. If the retaining element is for example cylindrical, thus, the retaining device can comprise a corresponding groove to receive the retaining element. If the retaining device is for example configured platelet-shaped, thus, it can act as a pedestal, in which the lighting device stands if the bistable element is unrolled or straight. The retaining device can for example comprise a mirror such that the entire device arrangement can serve as a makeup mirror with lighting.

Figure 2:
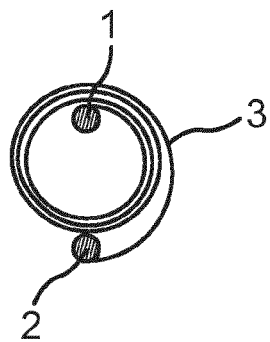
Figure 3:
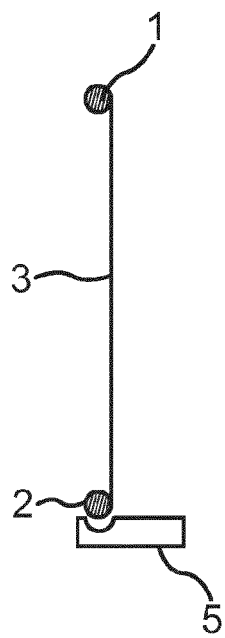
Figure 4:
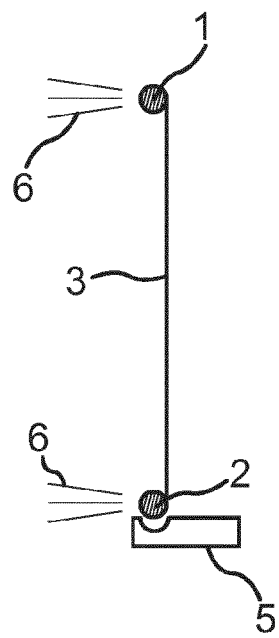
Figure 5:
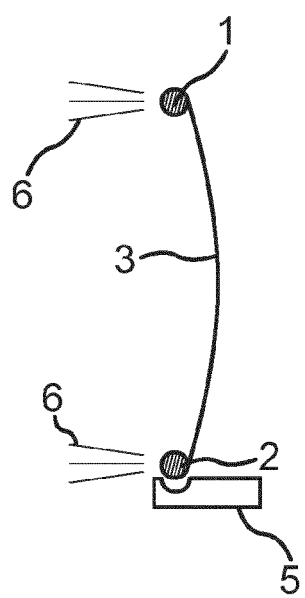
Figure 8:
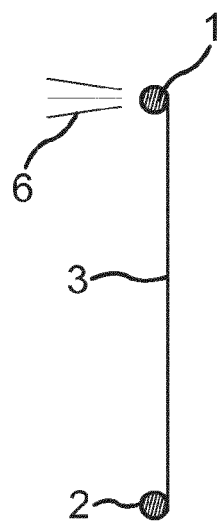
Figure 9:
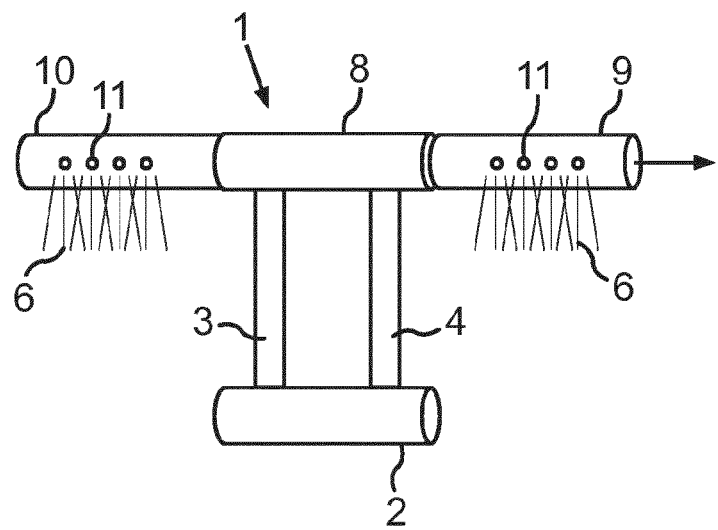

Now, the present invention is explained in more detail based on the attached drawings, in which there show:

FIG. 1 a lighting device with two bistable elements in the unrolled, stable state in a 3D view;

FIG. 2 a lighting device in a cross-sectional view in the rolled-up, stable state;

FIG. 3 the lighting device of FIG. 2 in the unrolled stable state;

FIG. 4 the lighting device of FIG. 3 in the turned-on state;

FIG. 5 the lighting device of FIGS. 2 to 4 in an instable intermediate state;

FIG. 6 a modified lighting device with additional spring elements in a first spring state;

FIG. 7 the lighting device of FIG. 6 in a second, bracket-like spring state;

FIG. 8 a lighting device with a luminous element and a retaining element without luminous functionality;

FIG. 9 a lighting device with telescopic luminous element in 3D view; and

Figure 10:
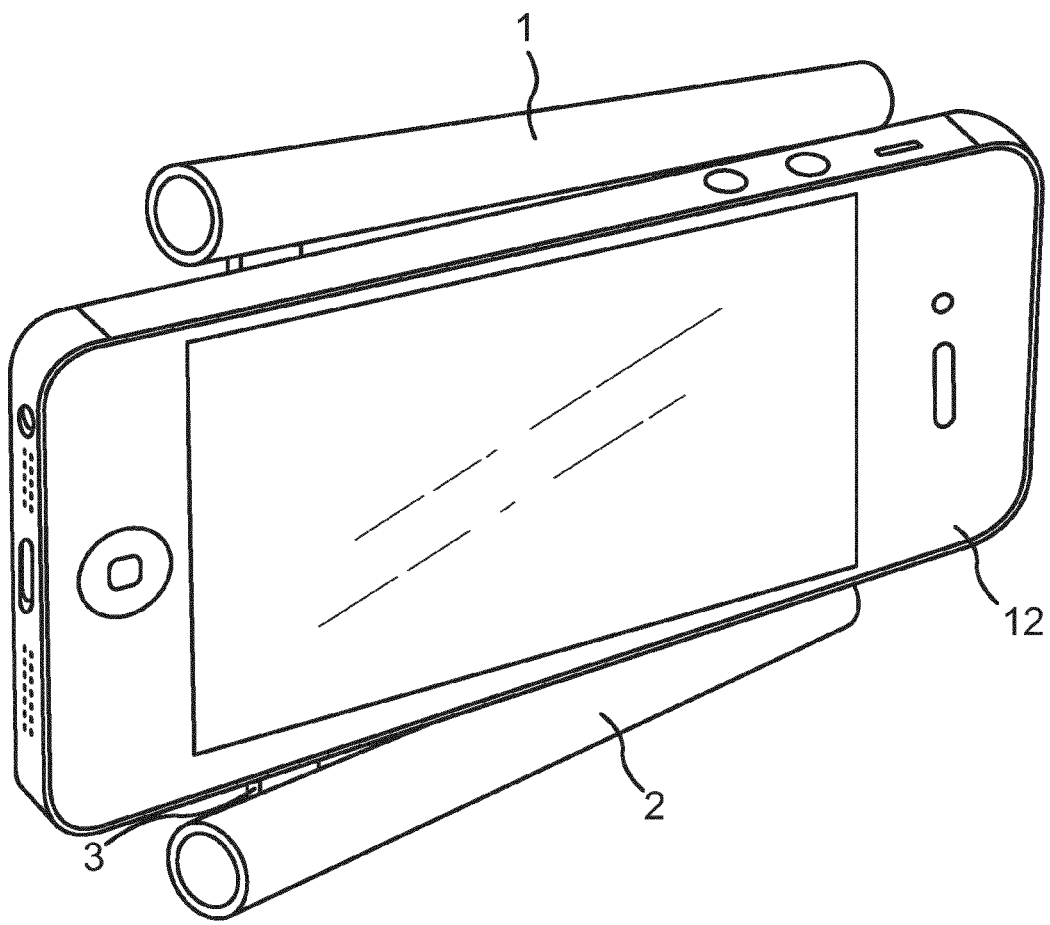

FIG. 10 a lighting device with clamped smart phone in 3D view.

The embodiments described in more detail below represent preferred embodiments of the present invention.

Lighting devices corresponding to the present invention can be attached to very different objects. In particular, they can be attached to mobile devices like mobile radio phones (e.g. smart phones) to ensure sufficient brightness in photo and video recordings. However, such a lighting device can for example also be attached to a makeup mirror, car mirror or the like in order that the viewer can see himself with better illumination. Moreover, however, the lighting device can also be attached to other objects to for example optically mark them. In the following, an application in particular in context of smart phones is presented. However, this application is not to be understood in restricting manner.

In the example of FIG. 1, a lighting device is illustrated, which comprises a luminous element 1 and a retaining element 2. The two elements 1 and 2 are attached to the ends of two bistable band elements 3 and 4 (below, bistable band elements are used representative of also other bistable elements). Thereby, an approximately rectangular formation arises, wherein luminous element 1 and retaining element 2 are parallel to each other and similarly the two bistable band elements 3 and 4 are parallel to each other. The luminous element 1 is attached to a first end section of the first bistable band element 3 and to a first end section of the second bistable band element 4. Similarly, the retaining element 2 is attached to a second end section of the first bistable band element 3 opposing the first end section as well as to a second end section of the second bistable band element opposing the first end section. It is not required that a respective end of one of the band elements 3, 4 is flush with the respective luminous element 1 or retaining element 2.

Rather, the end of a bistable band element 3, 4 can also protrude beyond the luminous element 1 on the side of the luminous element 1, which faces away from the retaining element 2. Similarly, one or two of the band elements 3, 4 can also protrude beyond the retaining element 2 on the side of the retaining element 2, which faces away from the luminous element 1. The protruding ends can for example be used for better handling or for further clamping objects.

The bistable band elements 3 and 4 are illustrated in a first stable state, namely an unrolled state, in FIG. 1. Therein, the two band elements 3 and 4 are approximately straight. As will be further explained in context of FIGS. 2 to 5, the two band elements 3 and 4 can also assume a second stable state and any intermediate states between these two stable states. In each other state than the first stable state, the two band elements are curved.

The luminous element 1 has luminous functionality and can correspondingly emit light. Thereto, it for example comprises one or more light emitting diodes, which are for example controlled via a control device and supplied by a battery or an accumulator. All of these components can be accommodated in a cylindrical housing of the luminous element 1.

The retaining element 2 can also comprise a cylindrical housing with e.g. the same dimensions as the luminous element 1. In some circumstances, it has pure retaining functionality to retain the entire lighting device for example on a smart phone (compare FIG. 10).

The lighting device illustrated in FIG. 1 can be varied in many regards. Thus, the retaining element 2 can for example also have luminous functionality. In particular, it can have the same luminous power as the luminous element 1. Optionally, a control and an energy storage are also provided in the retaining element 2. Alternatively, an energy storage and/or a control can also be provided only in one of the two elements 1 and 2. Optionally one of the band elements 3, 4 or both can also serve for current conduction to for example supply the luminous element 1 from the retaining element 2 or vice versa.

The housing of luminous element 1 and retaining element 2 can also have a cuboidal shape or another geometry. In particular, they do not have to be uniform along their longitudinal axis. The material of the housing can be fully transparent or be transparent only in an area. The housing can also be optimized with respect to its friction. Hereto, a rubber-like material can for example be selected at least in partial areas of the housing to obtain an increased friction on the object, to which the lighting device is to be attached.

In the example of FIG. 1, the lighting device comprises two parallel bistable band elements 3 and 4. In principle, however, a single bistable (band) element is also sufficient, by which the luminous element 1 and the retaining element 2 are retained together. Of course, three or more bistable (band) elements can also be provided in the lighting device. They preferably extend parallel to each other.

In a concrete configuration, both the luminous element 1 and the retaining element 2 can be fitted with LED strips and each emit in the same direction in the unrolled state of the band elements 3 and 4. The emission direction or the beam directions can be adapted to the requirements.

In FIG. 2, a lighting device is schematically illustrated in the side view. Here, the bistable band element 3 is in the second stable state and is rolled up. Here, the luminous element 1 and the retaining element 2 are found immediately at the ends of the bistable band element 3. In the second stable state, the band element 3 here winds multiple times around the luminous element 1. Thereby, a spiral arises, at the inner end of which the luminous element 1 and at the outer end of which the retaining element 2 are arranged. In principle, the places of luminous element 1 and retaining element 2 can of course also be interchanged.

The band element 3 and 4, respectively, can be rolled of spring steel and formed as a so-called snap band. By the rolled-in curvature, the respective band element 3, 4 can assume two stable states, namely the unrolled state according to FIG. 1 (first stable state) and the rolled-up state according to FIG. 2 (second stable state). The latter is achieved in that the band elements 3, 4 are slightly kinked in the state of FIG. 1. However, the bistable (band) element or elements can also be produced of carbon fiber containing, glass fiber containing or other plastics.

FIGS. 3 to 5 represent different states of the lighting device of FIG. 2. Again, a side view is selected. In FIG. 3, the bistable element 3 is in the second stable state, i.e. it is unrolled or stretched. The luminous element 1 and retaining element 2 are farthest apart from each other in this state. In contrast, the luminous element 1 and the retaining element 2 are arranged very close to each other in the second stable state of the bistable element 3. Thus, in the state of FIG. 2, the dimensions of the lighting device with respect to one dimension (stretching direction) are considerably smaller than in the state of FIG. 3.

The retaining element 2 can for example be plugged into a retaining device 5 or a pedestal. For example, the retaining device 5 comprises a recess, into which the retaining element can be form-fit plugged. In particular, it should be ensured that the lighting device stands in the retaining device resistant to tipping. In this state, the lighting device can be used as a simple, self-standing luminaire.

In FIG. 4, the self-standing luminaire of FIG. 3 is illustrated in the turned-on state. In the example, both the luminous element 1 and the retaining element 2 have luminous functionality. Both emit light 6 in the turned-on state. Here, the two light cones of the emitted light are uniform and identically directed. However, they can also be differently formed.

In FIG. 4, the lighting device, which can also be referred to as "bistable lamp", is illustrated between the unrolled and the rolled-up state, i.e. in an intermediate state between the first and the second stable state. This inherently instable state is characterized in that the bistable element 3 attempts to achieve the second stable state according to FIG. 2 by inherent spring force. Therefore, the luminous element 1 and the retaining element 2 would move towards each other without counterforce. Thus, if the bistable element is kinked, thus, it presses the luminous element 1 and the retaining element 2 towards each other. This means that the two elements can assume any small distances to each other below the maximum distance according to FIG. 3 and luminous element 1 and retaining element 2 are pressed towards each other in each state. The limit of this functionality is only achieved at a distance of the two elements, where the bistable element winds around itself (final state according to FIG. 2). This operating mode, according to which luminous element 1 and retaining element 2 are pressed towards each other between the first and the second stable state, is important for the adaptation of the lighting device to different object widths and in particular smart phone widths. For example, if one places a smart phone, the housing width of which is smaller than the maximum distance between luminous element 1 and retaining element 2, between these two elements, thus, the mentioned tensile force fixedly retains the lighting device on the housing of the smart phone. Thereby, it can be achieved that the "bistable lamp" can be attached to great many smart phones. The same applies to the "bistable lamp" with tablets or laptops. With a laptop, the "bistable lamp" can be attached to the screen. In this case, the light of the "bistable" lamp shines to the right and left of the screen and the user gets an optimum illumination for his Skype or video conference.

Furthermore, the benefit of the arrangement could be increased in that a mirror foil is attached between luminous element 1 and retaining element 2 in addition to the stable element or elements. In this manner, a rollable and illuminated makeup mirror could be realized. Optionally, the smart phone could also be clamped in this arrangement, wherein the mirror effect is then precisely not used.

In FIGS. 6 and 7, a further embodiment of a lighting device is illustrated. The lighting device is substantially constructed as in FIG. 3. However, the luminous element 1 and the retaining element 2 are not immediately attached to an end section of the bistable element 3. Rather, at least one of these elements 1, 2 is indirectly attached to the respective end section of the bistable element 3 by a spring element 7. This spring element 7 is a flexible part, which ensures that the lighting device can be even more reliably attached to multiple, different smart phone types. The spring element 7 can be manufactured of rubber or of another flexible or elastic substance. The attachment area of the luminous element 1 and retaining element 2, respectively, to the bistable element 3 becomes movable by the spring element and thereby can adapt to different smart phone measures. In FIG. 6, the spring elements 7 are illustrated in a pre-tensioned state. Thereby, the luminous element 1 and the retaining element 2 attempt to move towards each other corresponding to the arrows 8. In FIG. 7, the arrangement of FIG. 6 is illustrated in the relaxed state of the spring elements 7. Here, the lighting device has a bracket-like shape, which is emphasized by the spring elements 7.

The bistable elements can be prepared such that they at least temporarily "adhere" to the smart phone, i.e. a force-fit, but temporary attachment is achieved, by an additional measure (e.g. detachable adhesive or magnetism). In a further configuration, the luminous element or elements can be configured such that they comprise small retaining claws, which ensure a secure retention on the smart phone.

In principle (what is not claimed here), a lighting device with the just mentioned retaining claws at the luminous element and at the retaining element could also be configured such that one or more rubber bands are used instead of the bistable element. Then, the standing solution according to FIGS. 3 and 4 cannot be achieved, but luminous elements 1 and retaining element 2 could be retained on the smart phone by the tensile effect of the rubber band or bands and the retaining claws. However, this solution also does without the second stable state according to FIG. 2 such that the transport state of the lighting device would be less "tidy".

FIG. 8 again graphically clarifies the simplest variant of a lighting device according to the present invention. It only comprises a single luminous element 1 and the retaining element 2 is equipped without luminous functionality. Accordingly, only the luminous element 1 will here emit light 6 in the turned-on state of the lighting device.

FIG. 9 shows a further embodiment of a lighting device according to the invention. Here, the luminous element 1 is telescopically formed. From a cylindrical middle part 8 of the luminous element 1, also cylindrical side elements 9 and 10 with slightly reduced diameter can be extracted or extended on the end sides. Here, the two side parts 9 and 10 purely exemplarily comprise multiple LEDs 11. They correspondingly emit light 6 in the turned-on state. However, other light sources can also be provided in the luminous element 1. Light sources can also be installed in the middle part 8 although this is not illustrated in FIG. 9. Optionally, the luminous element 1 only begins lighting if one or both side parts 9 are extended. This embodiment with telescopic elements can be varied to the effect that more or less than three telescopic elements are used. Moreover, this lighting device can also be varied as the preceding embodiments.

FIG. 10 shows a device arrangement with a mobile device and a lighting device as it was described above. The mobile device is a smart phone 12. In the unrolled state of the bistable elements 3 and 4, respectively, the smart phone is brought between the luminous element 1 and the retaining element 2. This state is illustrated in FIG. 10. Subsequently, the bistable elements 3 and 4 are slightly kinked such that they assume the curved state corresponding to FIG. 5. In this state, the housing of the smart phone 12 counteracts the tensile force of the flexible element 3 and 4, respectively, such that the luminous element 1 and the retaining element 2 and optionally also the bistable elements 3, 4 are clamped to the housing of the smart phone 12. The lighting device can thus be used for photo and video recordings with the smart phone 12. It is immediately evident that the lighting device can be used for differently dimensioned smart phones or also other objects of different width.

LIST OF REFERENCE CHARACTERS

1 Luminous element
2 retaining element
3 band element
4 band element
5 retaining device
6 light
7 spring element
8 middle part
9 side element
10 side element
11 LED
12 smart phone

The invention claimed is:
1. A lighting device for attaching to a mobile device, the lighting device comprising,
a luminous element and
a retaining element,
wherein:
the luminous element is attached to a first end section of a first bistable element and the retaining element is attached to a second end section of the first bistable element opposing the first one,
the first bistable element is unrolled in a first stable state such that the luminous element is maximally spaced from the retaining element,
the first bistable element is rolled up in a second stable state,
the lighting device can be clamped to the mobile device by spring force of the first bistable element,
the luminous element and/or the retaining element are each attached to the respective end section of the first bistable element with an elastic spring element, wherein the lighting device with the first bistable element in its first stable state and the spring elements in their relaxed state has a bracket-like shape in cross-section.
2. The lighting device according to claim 1, wherein the retaining element also has a luminous function.

3. The lighting device according to claim 1, wherein a second bistable element, which is identically formed as the first bistable element, is arranged parallel to the first bistable element, and the luminous element is attached to a first end section of the second bistable element and the retaining element is attached to a second end section of the second bistable element opposing the first one.

4. The lighting device according to claim 1, wherein the retaining element and the luminous element are each cylindrically formed and their longitudinal axes are formed parallel to a roll axis of the first bistable element in the second stable state.

5. The lighting device according to claim 1, wherein the retaining element and/or the luminous element comprise a battery or an accumulator.

6. The lighting device according to claim 1, wherein the retaining element or the luminous element comprises a control device for controlling a luminous function of the retaining element and/or the luminous element.

7. The lighting device according to claim 1, wherein the luminous element comprises one or more light emitting diodes.

8. The lighting device according to claim 1, wherein the luminous element is telescopically extendable.

9. The lighting device according to claim 1, wherein at least one of the luminous element and the retaining element is water-proof and encloses a gas volume.

10. The lighting device according to claim 1, wherein the first and/or a second bistable element are formed band-shaped, foil-shaped or cloth-shaped.

11. A device assembly with a mobile device and a lighting device according to claim 1, wherein the first bistable element is neither in the first nor in the second stable state and therein the first bistable element presses the retaining element onto a first side of the mobile device and the luminous element onto a second side of the mobile device opposing the first side such that the lighting device is fixedly retained on the mobile device.

12. The device arrangement according to claim 11, wherein the mobile device is a smart phone, a tablet or a laptop.

13. A device arrangement with a retaining device and a lighting device according to claim 1, wherein the first bistable element is plugged into the retaining device in the first stable state and retained there such that the luminous element stands substantially perpendicularly above the retaining element.

* * * * *